US011158120B1

(12) United States Patent
Jespersen et al.

(10) Patent No.: US 11,158,120 B1
(45) Date of Patent: Oct. 26, 2021

(54) GHOST POINT FILTERING

(71) Applicant: Motional AD LLC, Boston, MA (US)

(72) Inventors: Thomas Koelbaek Jespersen, Singapore (SG); Yu Pan, Singapore (SG)

(73) Assignee: Motional AD LLC, Boston, MA (US)

(*) Notice: Subject to any disclaimer, the term of this patent is extended or adjusted under 35 U.S.C. 154(b) by 0 days.

(21) Appl. No.: 16/952,046

(22) Filed: Nov. 18, 2020

(51) Int. Cl.
*G06T 17/00* (2006.01)
*G01S 17/931* (2020.01)
*G06T 7/50* (2017.01)

(52) U.S. Cl.
CPC ............ *G06T 17/00* (2013.01); *G01S 17/931* (2020.01); *G06T 7/50* (2017.01); *G06T 2207/10028* (2013.01)

(58) Field of Classification Search
None
See application file for complete search history.

(56) References Cited

U.S. PATENT DOCUMENTS

2019/0120947 A1\* 4/2019 Wheeler ............... H04N 5/2329
2021/0003683 A1\* 1/2021 Chen ..................... G05D 1/0246

OTHER PUBLICATIONS

[No Author Listed], "SAE International: Surface Vehicle Recommended Practice: (R) Taxonomy and Definitions for Terms Related to Driving Automation Systems for On-Road Motor Vehicles," J3016, Sep. 30, 2016, 30 pages.

\* cited by examiner

*Primary Examiner* — Frank S Chen
(74) *Attorney, Agent, or Firm* — Fish & Richardson P.C.

(57) ABSTRACT

Among other things, techniques are described for obtaining a range image related to a depth sensor of a vehicle operating in an environment. A first data point is identified in the range image with an intensity at or below a first intensity threshold. A first number of data points are determined in the range image that have an intensity at or above a second intensity threshold in a first region of the range image. Then, it is determined whether the first number of data points is at or above a region number threshold. The first data point is removed from the range image if the first number of data points is at or above the region number threshold. Operation of the vehicle is then facilitated in the environment based at least in part on the range image. Other embodiments may be described or claimed.

20 Claims, 15 Drawing Sheets

GHOST POINT FILTERING

FIELD OF THE INVENTION

This description relates to removal of ghost points from point clouds produced by time-of-flight (ToF) systems such as a light detection and ranging (LiDAR) system.

BACKGROUND

Typically, a ToF system such as LiDAR will collect ToF data and generate a point cloud related to that data. The point cloud may, in some cases, include points that are the result of reflection errors within the transmitter or receiver of the ToF system. In descriptions herein, these points are referred to as "ghost" points, and their presence in the point cloud often causes errors in the interpretation and processing of the ghost point and the surrounding points of the point cloud. For example, an autonomous vehicle that is identifying obstacles based on the point cloud can mis-identify the presence of an object based on the ghost points within the point cloud, which can negatively impact the control of the vehicle.

DETAILED DESCRIPTION

Figure 1:
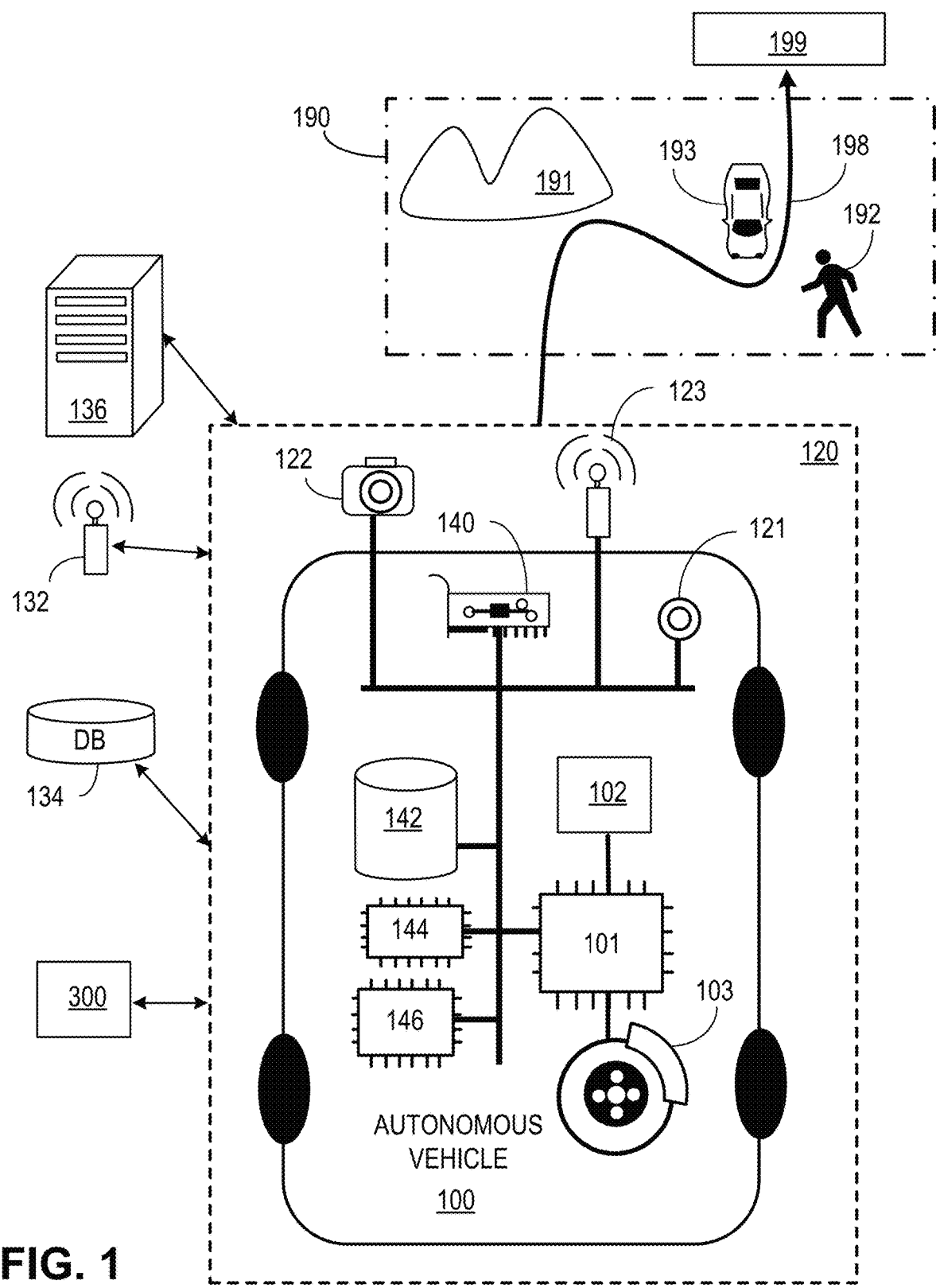
FIG. 1 shows an example of an autonomous vehicle having autonomous capability.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, systems, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Ghost Point Occurrence
6. Ghost Point Filter Techniques General Overview A vehicle (such as an autonomous vehicle) will include at least one processor that uses a ghost point filter to remove ghost points from a three-dimensional (3D) point cloud generated by a LiDAR system or some other ToF system (e.g., radio detection and ranging (RADAR) or some other system) included in or on the vehicle. As noted above, the ghost points are erroneous points of a point cloud captured by the LiDAR system during a LiDAR scan that do not correspond to an actual object reflection but rather are the result of an optical artifact. In an embodiment, the ghost point filter identifies a low-intensity point (e.g., a point with a low optical intensity, which may also be considered as an optical return with low received energy) in a point cloud. The ghost point filter identifies the number of high-intensity points (e.g., a point with a high optical intensity, which may also be considered as an optical return that saturates the receiver) in pre-defined regions of the point cloud that are relative to the identified low-intensity point. Based on the number of high-intensity points in the pre-defined regions, the low-intensity point may be identified as a ghost point, and removed from the point cloud, or kept in the point cloud. It will be understood that embodiments herein will be described with respect to LiDAR, however another embodiment will additionally or alternatively include some other type of ToF detection.

An advantage of removing ghost points using the disclosed ghost point filter is that the accuracy of the point cloud, and resultant operation of the vehicle which relies in part on an accurate point cloud, is improved. Notably, this advantage is realized through a software solution that may otherwise require expensive hardware modification to a significant number of LiDAR systems. In an embodiment, the software solution will be recognized as computationally efficient, as it is designed to operate on an initial range image of the system (e.g., a range image prior to any post-processing of the range image produced by the LiDAR system(s)).

System Overview

FIG. 1 shows an example of an autonomous vehicle (AV) 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real-world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment.

In general, this document describes technologies applicable to any vehicles that have one or more autonomous capabilities including fully AVs, highly AVs, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, ToF depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of AV 100 to the remotely located database 134. In an embodiment, communication devices 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the AV 100, or transmitted to the AV 100 via a communications channel from the remotely located database 134.

Computer processors 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the AV 100. In an embodiment, peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third-party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third-party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
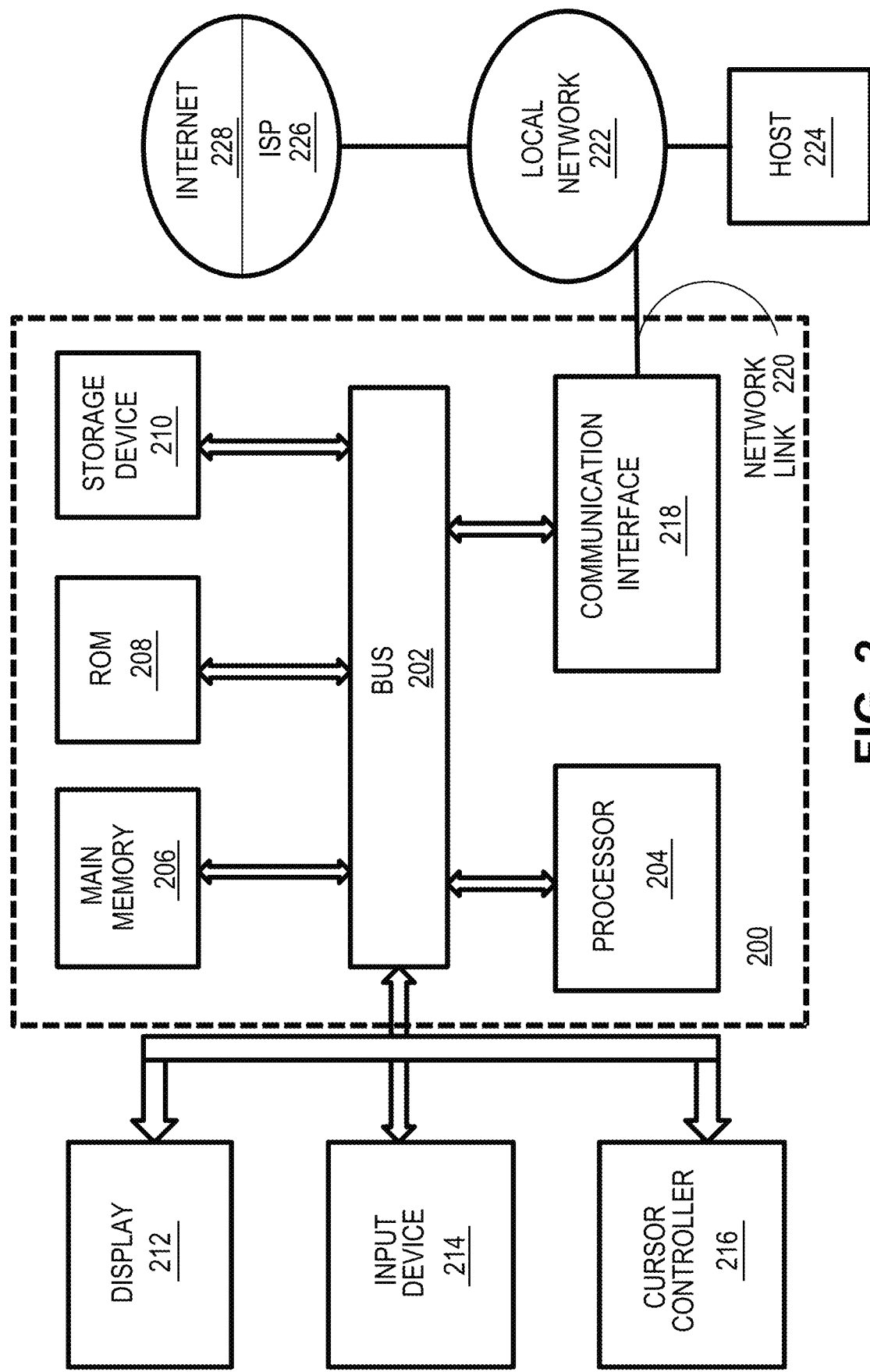
FIG. 2 shows a computer system.

FIG. 2 shows a computer system 200. In an implementation, the computer system 200 is a special-purpose computing device. The special-purpose computing device is hard-wired to perform the techniques or includes digital electronic devices such as one or more ASICs or field programmable gate arrays (FPGAs) that are persistently programmed to perform the techniques, or can include one or more general-purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a processor 204 coupled with a bus 202 for processing information. The processor 204 is, for example, a general-purpose microprocessor. The computer system 200 also includes a main memory 206, such as a RAM or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 can optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains the cloud or a part of the cloud.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

Autonomous Vehicle Architecture

Figure 3:
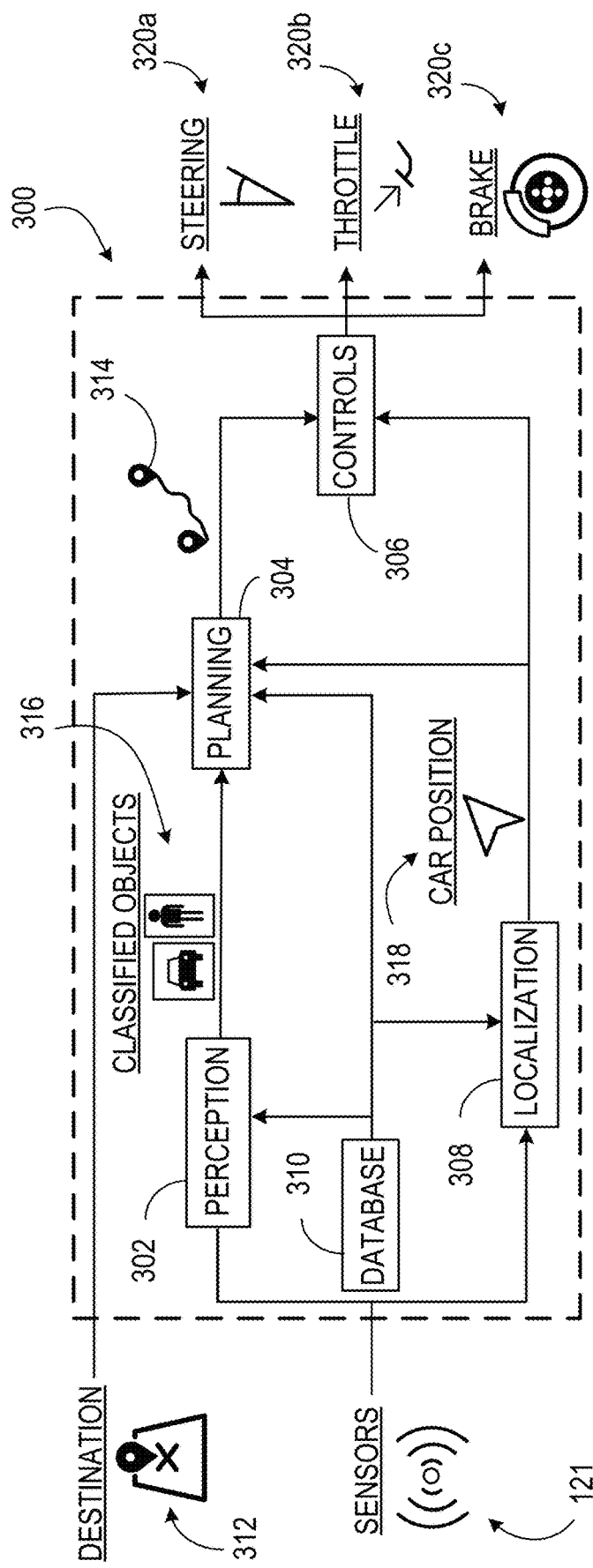
FIG. 3 shows an example architecture for an autonomous vehicle.

FIG. 3 shows an example architecture 300 for an AV (e.g., the AV 100 shown in FIG. 1). The architecture 300 includes a perception system 302 (sometimes referred to as a perception circuit), a planning system 304 (sometimes referred to as a planning circuit), a control system 306 (sometimes referred to as a control circuit), a localization system 308 (sometimes referred to as a localization circuit), and a database system 310 (sometimes referred to as a database circuit). Each system plays a role in the operation of the AV 100. Together, the systems 302, 304, 306, 308, and 310 can be part of the AV system 120 shown in FIG. 1. In some embodiments, any of the systems 302, 304, 306, 308, and 310 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 302, 304, 306, 308, and 310 is sometimes referred to as a processing circuit (e.g., computer hardware, computer software, or a combination of the two). A combination of any or all of the systems 302, 304, 306, 308, and 310 is also an example of a processing circuit.

In use, the planning system 304 receives data representing a destination 312 and determines data representing a trajectory 314 (sometimes referred to as a route) that can be traveled by the AV 100 to reach (e.g., arrive at) the destination 312. In order for the planning system 304 to determine the data representing the trajectory 314, the planning system 304 receives data from the perception system 302, the localization system 308, and the database system 310.

The perception system 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning system 304.

The planning system 304 also receives data representing the AV position 318 from the localization system 308. The localization system 308 determines the AV position by using data from the sensors 121 and data from the database system 310 (e.g., a geographic data) to calculate a position. For example, the localization system 308 uses data from a GNSS (Global Navigation Satellite System) sensor and geographic data to calculate a longitude and latitude of the AV. In an embodiment, data used by the localization system 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 306 receives the data representing the trajectory 314 and the data representing the AV position 318 and operates the control functions 320a-c (e.g., steering, throttling, braking, and ignition) of the AV in a manner that will cause the AV 100 to travel the trajectory 314 to the destination 312. For example, if the trajectory 314 includes a left turn, the control system 306 will operate the control functions 320a-c in a manner such that the steering angle of the steering function will cause the AV 100 to turn left and the throttling and braking will cause the AV 100 to pause and wait for passing pedestrians or vehicles before the turn is made.

AV Inputs

Figure 4:
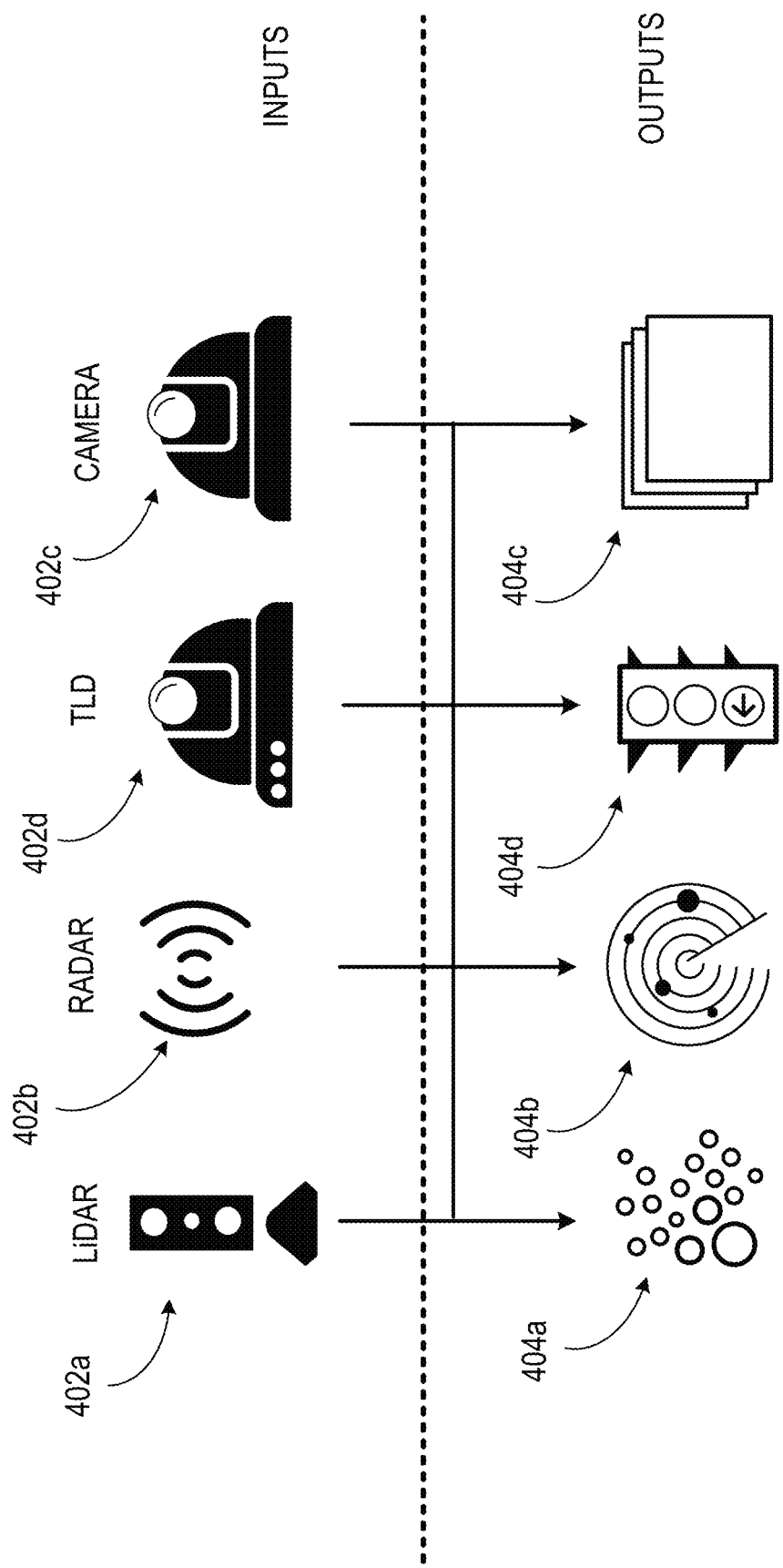
FIG. 4 shows an example of inputs and outputs that can be used by a perception system.

FIG. 4 shows an example of inputs 402a-d (e.g., sensors 121 shown in FIG. 1) and outputs 404a-d (e.g., sensor data) that is used by the perception system 302 (FIG. 3). One input 402a is a LiDAR system (e.g., LiDAR 123 shown in FIG. 1). LiDAR is a technology that uses light (e.g., bursts of light such as infrared light) to obtain data about physical objects in its line of sight. A LiDAR system produces LiDAR data as output 404a. For example, LiDAR data is collections of 3D or 2D points (also known as a point clouds) that are used to construct a representation of the environment 190.

Another input 402b is a RADAR system. RADAR is a technology that uses radio waves to obtain data about nearby physical objects. RADARs can obtain data about objects not within the line of sight of a LiDAR system. A RADAR system produces RADAR data as output 404b. For example, RADAR data are one or more radio frequency electromagnetic signals that are used to construct a representation of the environment 190.

Another input 402c is a camera system. A camera system uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 402d is a traffic light detection (TLD) system. A TLD system uses one or more cameras to obtain information about traffic lights, street signs, and other physical objects that provide visual navigation information. A TLD system produces TLD data as output 404d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system is about 120 degrees or more.

In some embodiments, outputs 404a-d are combined using a sensor fusion technique. Thus, either the individual outputs 404a-d are provided to other systems of the AV 100 (e.g., provided to a planning system 304 as shown in FIG. 3), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 5:
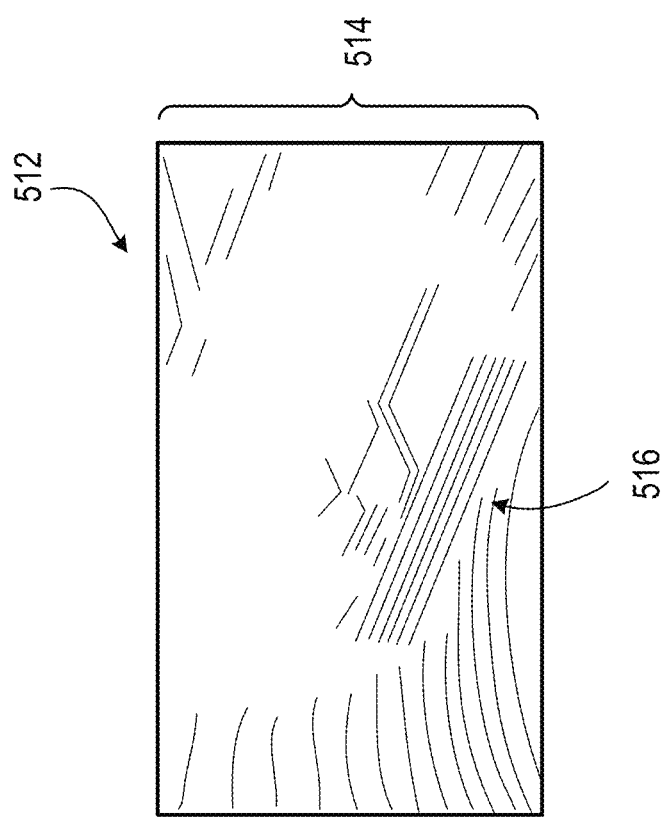
FIG. 5 shows an example of a LiDAR system.
Figure 5:
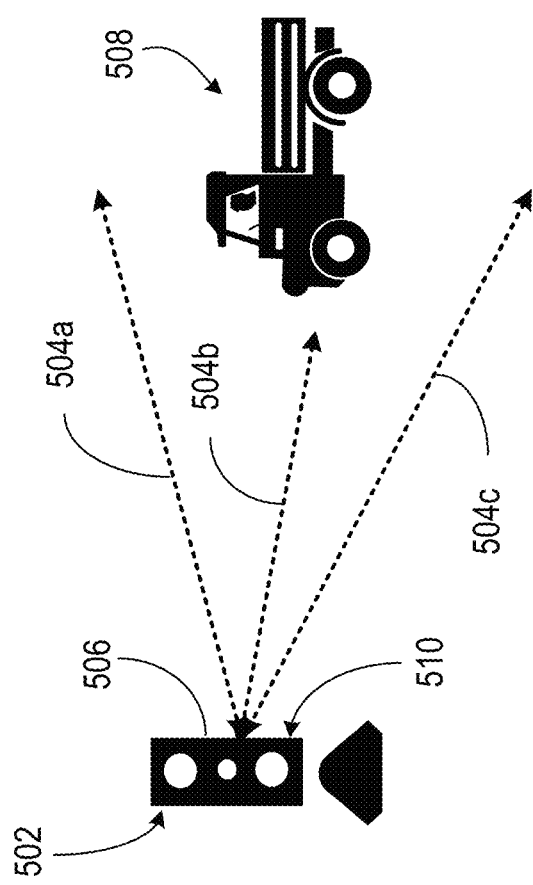

FIG. 5 shows an example of a LiDAR system 502 (e.g., the input 402a shown in FIG. 4). The LiDAR system 502 emits light 504a-c from a light emitter 506 (e.g., a laser transmitter). Light emitted by a LiDAR system is typically not in the visible spectrum; for example, infrared light is often used. Some of the light 504b emitted encounters a physical object 508 (e.g., a vehicle) and reflects back to the LiDAR system 502. (Light emitted from a LiDAR system typically does not penetrate physical objects, e.g., physical objects in solid form.) The LiDAR system 502 also has one or more light detectors 510, which detect the reflected light. In an embodiment, one or more data processing systems associated with the LiDAR system generates an image 512 representing the field of view 514 of the LiDAR system. The image 512 includes information that represents the boundaries 516 of a physical object 508. In this way, the image 512 is used to determine the boundaries 516 of one or more physical objects near an AV.

Figure 6:
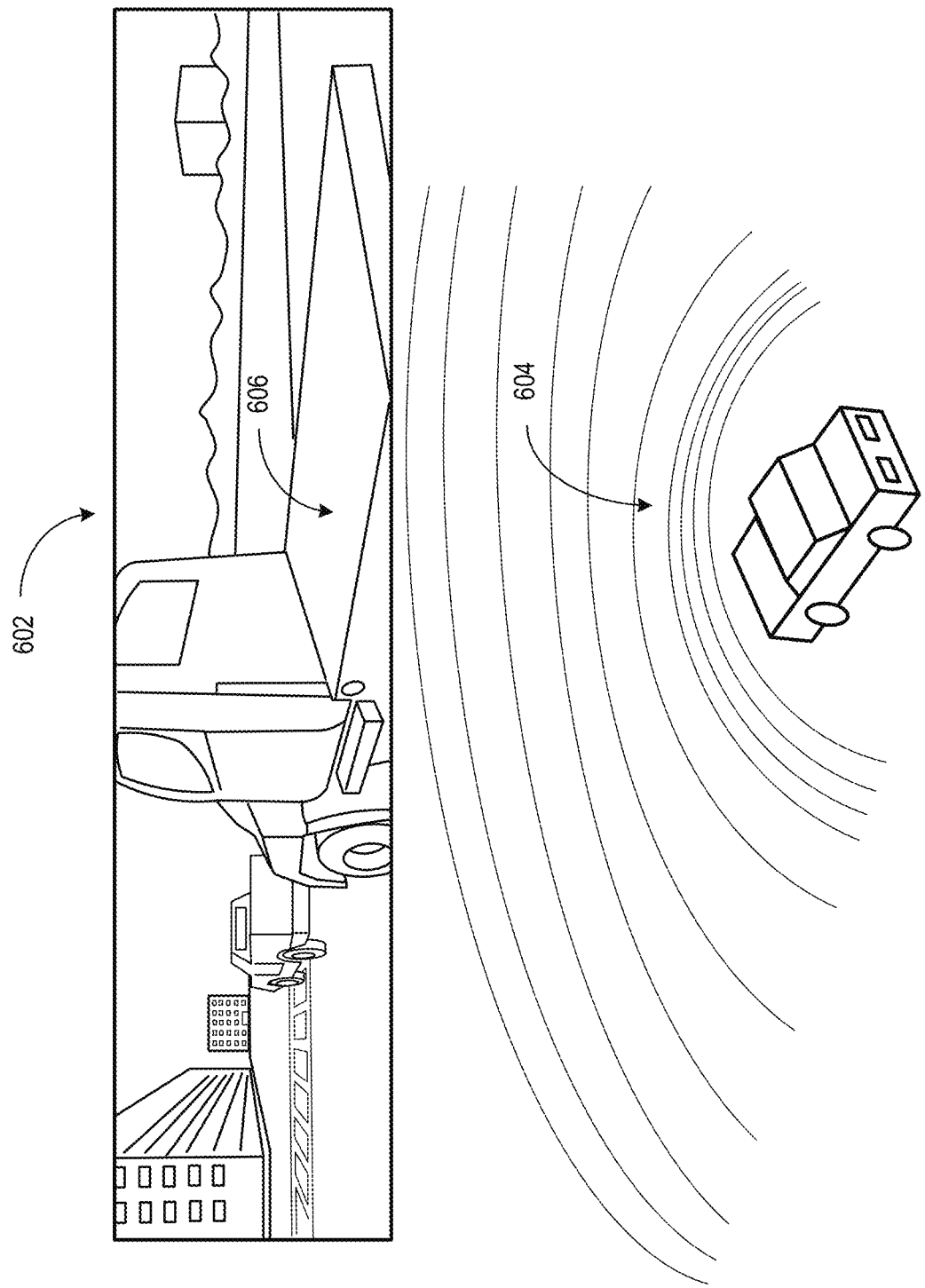
FIG. 6 shows the LiDAR system in operation.

FIG. 6 shows the LiDAR system 502 in operation. In the scenario shown in this figure, the AV 100 receives both camera system output 404c in the form of an image 602 and LiDAR system output 404a in the form of LiDAR data points 604. In use, the data processing systems of the AV 100 compares the image 602 to the data points 604. In particular, a physical object 606 identified in the image 602 is also identified among the data points 604. In this way, the AV 100 perceives the boundaries of the physical object based on the contour and density of the data points 604.

Figure 7:
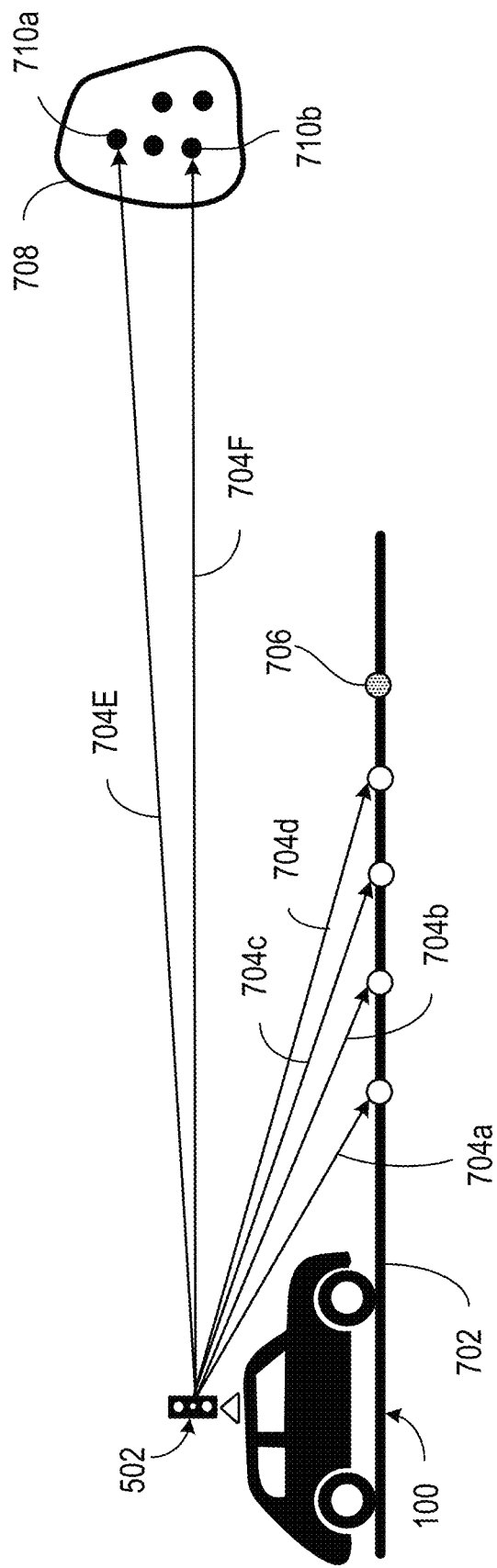
FIG. 7 shows the operation of the LiDAR system in additional detail.

FIG. 7 shows the operation of the LiDAR system 502 in additional detail. As described above, the AV 100 detects the boundary of a physical object based on characteristics of the data points detected by the LiDAR system 502. As shown in FIG. 7, a flat object, such as the ground 702, will reflect light 704a-d emitted from a LiDAR system 502 in a consistent manner. Put another way, because the LiDAR system 502 emits light using consistent spacing, the ground 702 will reflect light back to the LiDAR system 502 with the same consistent spacing. As the AV 100 travels over the ground 702, the LiDAR system 502 will continue to detect light reflected by the next valid ground point 706 if nothing is obstructing the road. However, if an object 708 obstructs the road, light 704e-f emitted by the LiDAR system 502 will be reflected from points 710a-b in a manner inconsistent with the expected consistent manner. From this information, the AV 100 can determine that the object 708 is present.

Ghost Point Occurrence

As previously noted, the term "ghost point" refers to a point in a LiDAR point cloud based on erroneous return points in the point cloud that is captured during a LiDAR scan. More specifically, ghost points are the result of horizontal diffusion of the LiDAR beam during the transmit and return path (e.g., the path from the LiDAR emitter to an object, and then the reflection from the object to the LiDAR receiver) leading to multipath effects. The presence of ghost points will introduce inaccuracies into the point cloud, which may negatively impact actions of an AV that relies upon the point cloud data for functions such as autonomous navigation.

Figure 8:
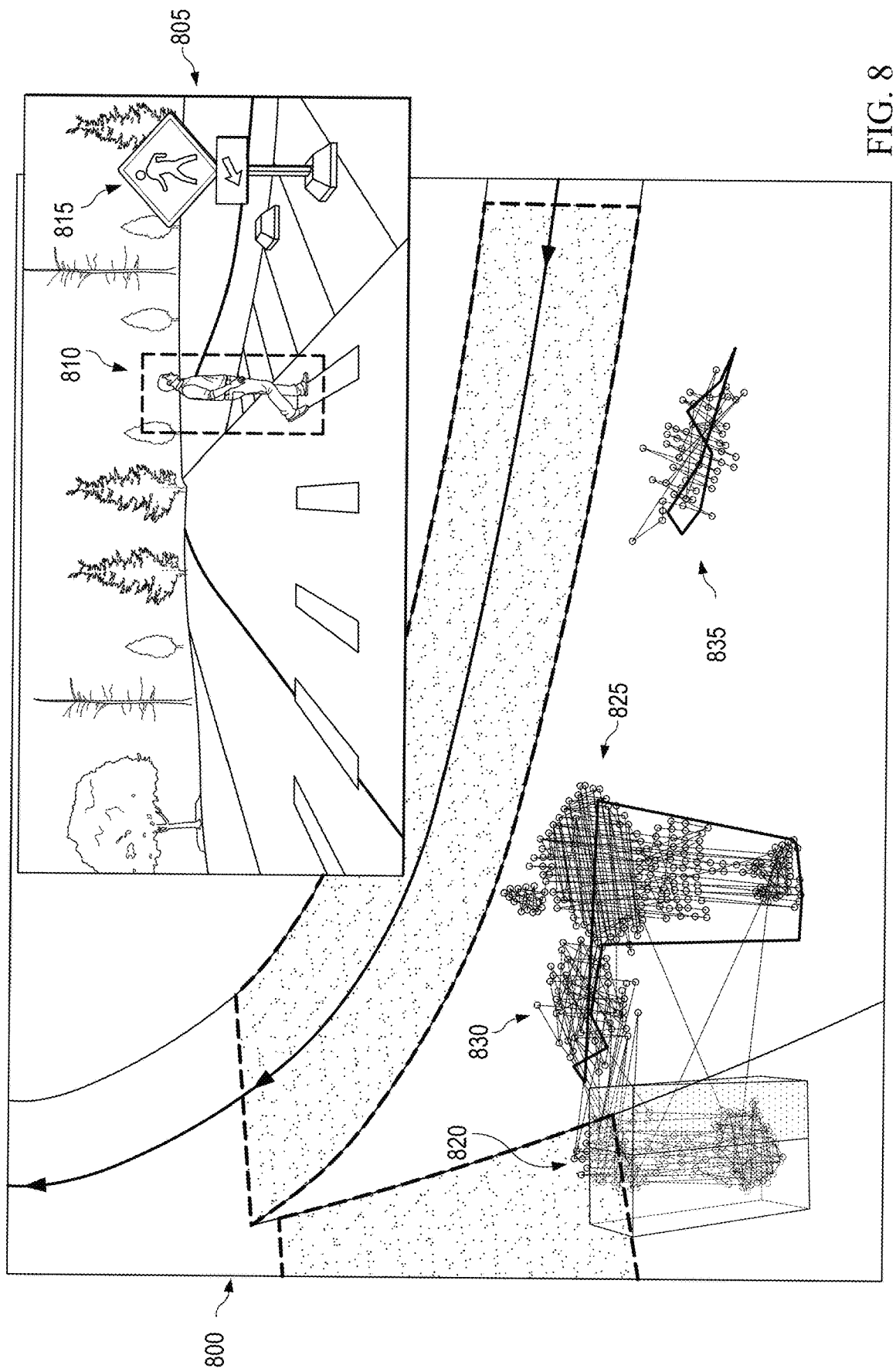
FIG. 8 shows an example comparison between a real-world image and a point cloud which may result from a ToF system.

FIG. 8 shows an example comparison between a real-world image and a point cloud which may result from a ToF system. Specifically, FIG. 8 depicts an example of a real-world image 805 of a scenario and the resultant model 800 of the scenario. In the real-world image 805, an individual 810 is adjacent to, but separate from, a sign 815. The point clouds 820, 825 of the individual 810 and the sign 815, respectively, are depicted in the model at 800.

It will be understood that in some embodiments, the point clouds 820 and 825 may be considered as different regions or zones of a single point cloud, or a merged point cloud. However, for the sake of ease of description here, elements 820 and 825 will be referred to as separate point clouds. In one embodiment, the point clouds 820 and 825 may be point clouds produced by a single LiDAR system, while in other embodiments the point clouds 820 and 825 may be point clouds produced by a separate LiDAR systems.

As may be seen in FIG. 8, a number of points 830 are positioned between the point clouds 820, 825 of the individual and the sign, respectively. Additionally, points 835 are present. By comparison of the model 800 with the real-world image 805, it may be seen that there is no object between the individual 810 and the sign 815. Rather, the points that make up point cloud 830 are ghost points that are the result of horizontal diffusion of reflections generated as a result of operation of the LiDAR system that generated the point clouds 820 and 825. Specifically, the point cloud 830 may be a result of diffusion based on one or both of a retroreflector such as the sign 815 or some other retroreflector. As used herein, a retroreflector is a device or surface that reflects radiation (usually light) back to its source with minimum scattering and minimum attenuation.

Additionally, it may be seen that there is no object to the right of the sign 815 in the real-world image 805. Rather, the points that make up point cloud 835 are ghost points that are the result of horizontal diffusion of reflections generated as a result of operation of the LiDAR system. Similarly to point cloud 830, the point cloud 835 may be a result of diffusion based on the sign 815.

Similarly to elements 820 and 825, in another embodiment the point clouds 830 and 835 may be referred to as a region or zone of a single larger point cloud. However, for the sake of description herein, element 830 will be referred to as an individual point cloud.

In one scenario, the point cloud 830 would be interpreted by an object detector (e.g., a deep neural network) of a perception system (e.g., perception system 302 of AV 100) as a solid object, and so the AV (e.g., the planning system 304) would attempt to navigate around the object. Additionally, because the point cloud 830 is based on diffusion reflections (or, alternatively, "multipath returns") generated as a result of operation of the LiDAR system, as the LiDAR system moves with the AV and resamples the environment, the point cloud 830 may change or disappear, which could further impact the accuracy of the object detector and thus the operation of the AV.

Figure 9A:
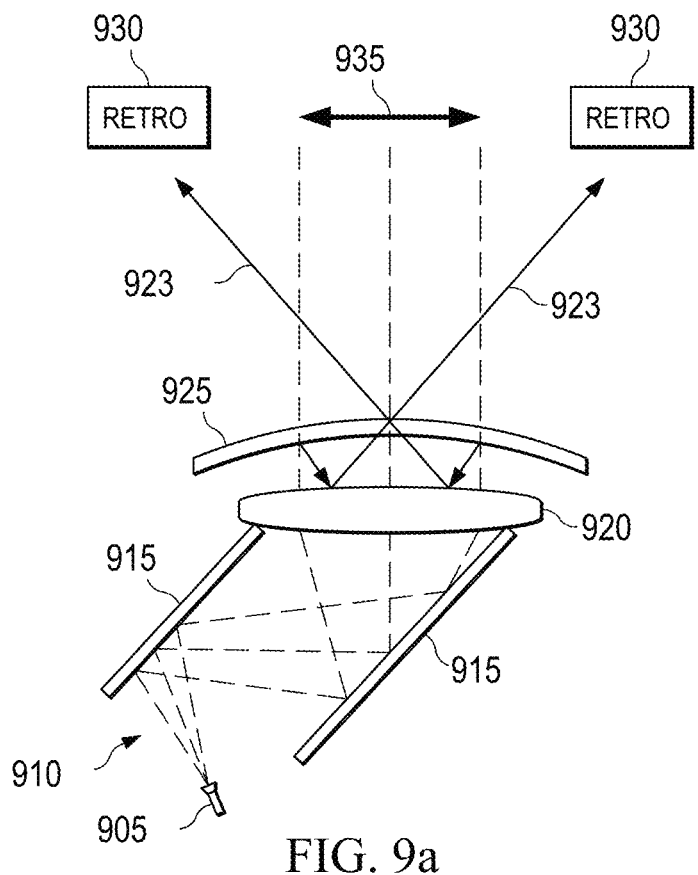
FIGS. 9a and 9b depict an example transmission structure and receive structure of a ToF system.
Figure 9B:
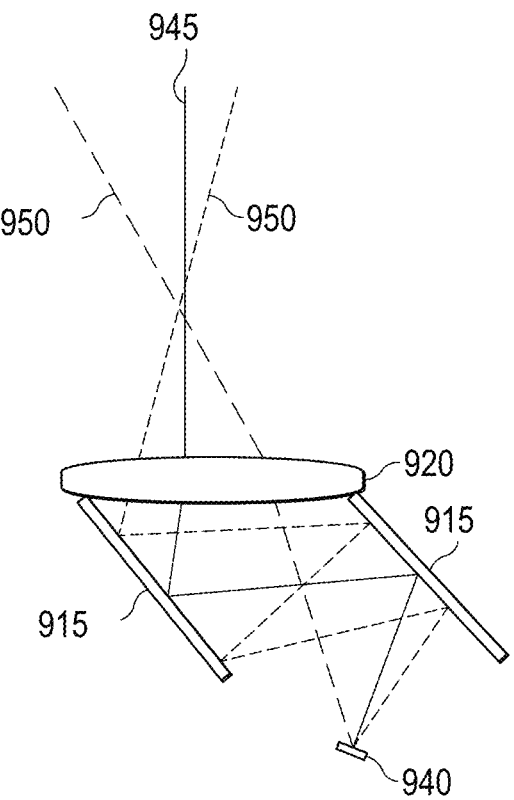

FIGS. 9a and 9b (collectively referred to as "FIG. 9") depict an example transmission structure and receive structure of a ToF system such as a LiDAR system. Specifically, FIG. 9a depicts a simplified example of a transmission structure (e.g., a "transmitter") of a LiDAR system, and FIG. 9b depicts a simplified example of a receive structure (e.g., a "receiver") of the LiDAR system.

The example transmitter includes an emitter 905. In the embodiment of a LiDAR system, the emitter 905 is an optical emitter (e.g., a laser diode) that is configured to emit a light beam 910 in the visible spectrum, the infrared spectrum, the ultraviolet spectrum, or some other spectrum. In another embodiment, the emitter 905 is a different type of emitter which emits a signal in the radio spectrum or some other type of electromagnetic signal.

In the example transmitter shown, cavity 915 includes reflective surfaces that reflect the light beam 910 as it propagates the length of the cavity 915 until it reaches a lens 920. The lens 920 is configured to focus the light beam 910 along a pre-defined field of view 935. The transmitter also includes an optical dome 925 which, in an embodiment, is a transparent material that is arranged to generally cover the lens 920 to protect the lens from damage such as a scratch. The optical dome 925 is, in an embodiment, curved and as may be seen in FIG. 9a, causes a reflection of the light beam 910, which is then reflected by the lens 920 to exit the optical dome 925 as reflected light beams 923. One or more of the reflected light beams 923 impinge upon a reflective surface such as a retroreflector 930, which reflects the light beams back to receiver Referring to FIG. 9b, the receiver receives reflected light beams 945 and 950 which are refracted and focused by a lens 920 into cavity 915, where they propagate through cavity 915 until they arrive at a photodiode 940. The photodiode 940 is configured to register the arrival of an optical signal and convert the optical signal into an electrical signal which is then supplied to another element of the LiDAR system (or an electrical device communicatively coupled with the LiDAR system). In an embodiment, photodiode 940 is an avalanche photodiode (APD).

In the embodiment depicted in FIG. 9, the transmission field of view 935 and the optical reception path 945 are considered to be the nominal directions. That is, a processor coupled with the APD 940 expects that an optical signal received by the APD 940 will arrive in the direction indicated by optical path 945. However, because of the retroreflectors 930, reflected light beams 950 that are different from the nominal direction indicated by the optical path 945 will be received. These reflected light beams 950 will be highly attenuated, and therefore have a low optical intensity. In this situation, the reflected light beams received along optical paths 950 will register as low-intensity points received from the nominal direction (e.g., along the optical path 945), resulting in "ghost points" as described above.

Often, ghost points will appear on either side of a retroreflector such as a street sign or some other object, or as an aura around the object. The ghost points will have a similar shape and physical structure as the retroreflector, and appear at the same range from the LiDAR system as the retroreflector itself.

Ghost Point Filter Techniques

A ghost point is based on a reflection from a retroreflector (e.g., a street sign, a vehicle, etc. as described above) that is angled with respect to the nominal direction of the LiDAR system. In an embodiment, the angle at which the presence of a retroreflector will cause a ghost point is a fixed angle for a given system which, for a LiDAR system, is related to the optical design. For example, as a LiDAR system (e.g., a LiDAR system that may be the same as or similar to LiDAR system 502, above) approaches a retroreflector (e.g., attached to the roof of an AV 100), the observed ghost point may move closer to the retroreflector or, in certain cases, disappear from the LiDAR scan depending on how the material and shape of the retroreflector which determines how the light will reflect.

Figure 10:
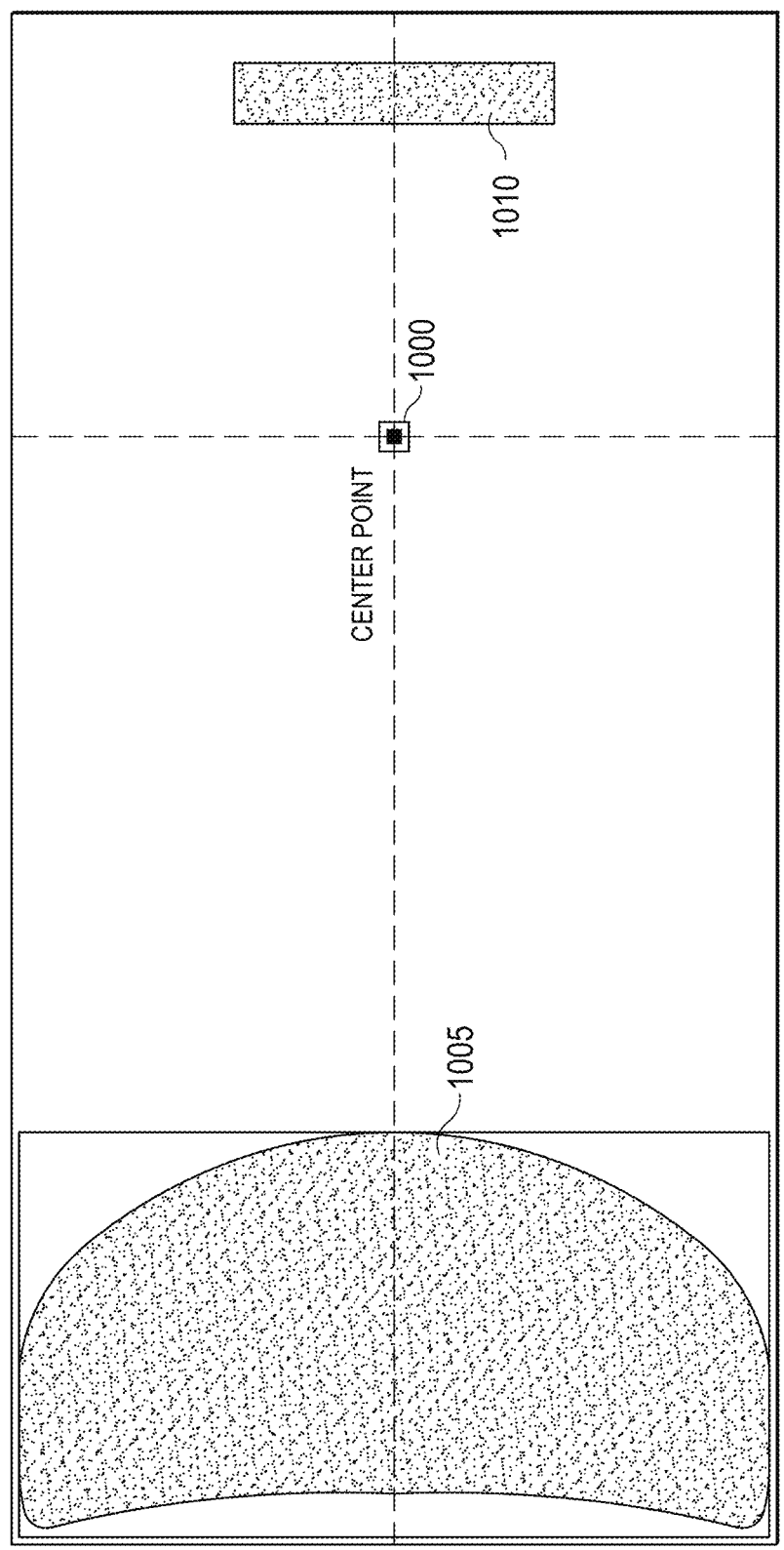
FIG. 10 depicts an example of ghost point regions.
Figure 11:
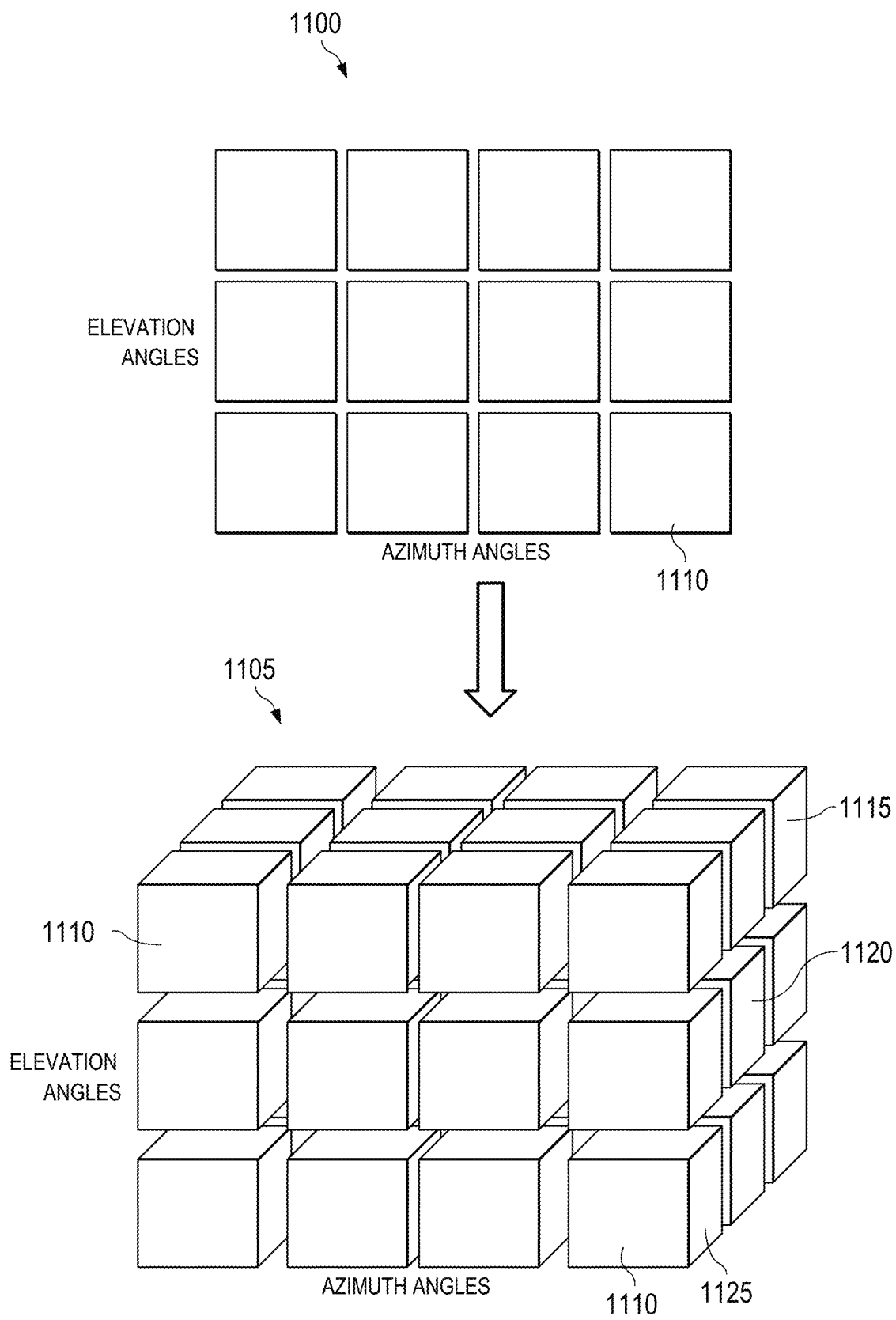
FIG. 11 depicts an example of a range image for processing by a ghost point removal filter.

Based on this fixed angle, a "ghost zone" is broadly defined as a region at a fixed angle from the LiDAR system that leads to the presence of a ghost point, as described fully in reference to FIGS. 10 and 11.

FIG. 10 depicts an example of ghost point regions. Specifically, FIG. 10 depicts an example of ghost point regions 1005 and 1010 on either side of a center point 1000 (defined below) based on a calibration test conducted to identify the location of said ghost point regions 1005/1010.

To conduct the calibration test, in this embodiment, a LiDAR system is fixated and the location of the nominal direction is marked with the center point 1000. In other words, the location of the center point 1000 corresponds to the nominal optical path 945. The center point 1000 is a point on a test panel that includes a plurality of LEDs. Respective LEDs of the test panel are then activated. LEDs in the ghost point regions 1005/1010 will generate light beams that are analogous to the reflected light beams 950 received by the photodiode described above in reference to FIG. 9. That is, LEDs in the ghost point regions 1005/1010 will cause the receiver of the actual LiDAR system to register a low-intensity optical signal although they are outside of an intended nominal transmission and reception path of the LiDAR system.

Through this calibration test procedure, ghost point regions 1005/1010 are identified for a particular center point 1000. In one embodiment, a single ghost point region or pair of ghost point regions (e.g., ghost point regions 1005/1010) are used for a LiDAR system. In another embodiment, different ghost point regions are defined for different locations of the center point 1000. That is, a different calibrated ghost point region is used for different elevation angles (e.g., scan lines) of the LiDAR scan or different azimuth (e.g., lateral) locations.

To apply a ghost point removal filter based on the identified ghost point regions, a range image is identified and stored as a tensor. Specifically, the LiDAR system generates a range image that includes a plurality of LiDAR return points. FIG. 11 depicts an example of a range image for processing by a ghost point removal filter.

As shown at 1100, the range image includes a number of data points 1110. Each of the data points 1110 has data related to an elevation angle (which, in one embodiment, is 0.60 degrees, 0.26 degrees, and −0.08 degrees) as measured from a direction in which the LiDAR system is pointing when the range image is generated. Additionally, each of the data points 1110 has an azimuth angle (which, in one embodiment, is −0.4 degrees, 0 degrees, 0.4 degrees, and 0.8 degrees) as measured from a direction in which the LiDAR system is pointing when the data points are collected. It will be understood that these example angles are intended only as examples related to one configuration of a tensor, and another embodiment may include different values for the elevation or azimuth angles, or different separations between each of the data points 1110.

The data points 1110 are then organized as a tensor 1105, which includes a number of rows, columns, and channels. Specifically, the rows and columns correspond to the elevation angles and azimuth angles, respectively, as shown in 1100. The tensor 1105 then includes a number of channels 1115, 1120, and 1125, which correspond to different values related to each of the data points 1110. For example, one channel 1125 corresponds to range information related to each of the data points 1110 (e.g., the measured distance of the object that reflected the optical signal and generated the data point 1110). Another channel 1120 corresponds to the intensity of the data point 1110, that is, the received energy of the optical signal. Another channel 1115 corresponds to the point index of the data point 1110, that is, an identifier of the data point within the range image. These channels are, however, an example in accordance with one embodiment, and another embodiment may have more or fewer channels, or channels arranged in a different configuration within the tensor 1105.

After the range image has been converted to a tensor such as tensor 1105, and the ghost point regions have been identified, a kernel is constructed to filter low-intensity ghost points from the range image. Generally, a kernel is a matrix that is applied to an image (or, more specifically, the tensor 1105) to identify and alter or extract certain features (e.g., ghost points) from the image. In one embodiment, the kernel is a convolutional kernel, a convolutional neural network (CNN) kernel, a machine learning (ML)-based kernel, etc. In embodiments where the kernel is a CNN kernel or a ML-based kernel, the kernel may be based on or modified by, for example, the specific ghost point zones that are identified or used, the number of ghost points that are identified or filtered based on use of the kernel, the size or shape of the retroreflector, etc.

Figure 12:
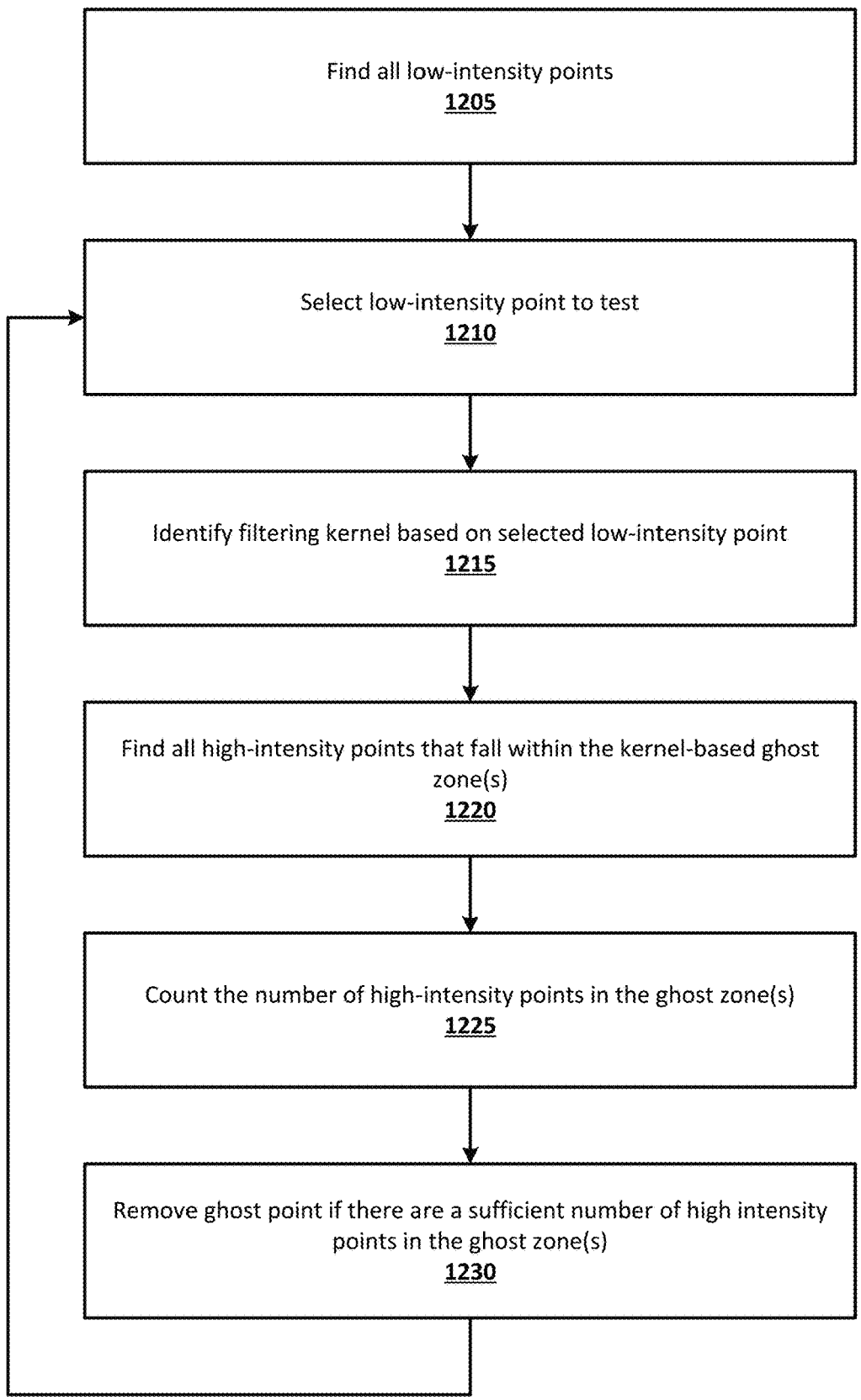
FIG. 12 depicts a high-level example technique of removal of a ghost point from a range image.

FIG. 12 depicts a high-level example technique of removal of a ghost point from a range image based on a kernel. In an embodiment, the technique is performed by, in whole or in part, a perception system such as perception system 302 of FIG. 3, a processor such as processor 204 of FIG. 2, or some other element of a LiDAR system or vehicle as described herein.

Initially, the technique includes finding all low-intensity points in the range image at 1205. Specifically, the technique includes finding low-intensity points in the tensor 1105. Identifying the low-intensity points, in one embodiment, includes identifying data points in the tensor with an intensity value (e.g. a value of the intensity channel 1120 of a data point 1110) at or below a threshold. In one embodiment, the threshold is pre-identified based on, for example, the type of LiDAR system used or some other characteristic of the LiDAR system. As one example, the threshold is pre-identified during the calibration process of the LiDAR system as described with respect to FIG. 10. In another embodiment, the threshold is identified based on intensity values of the range image. That is, the threshold is identified through analysis of the intensity values of various data points in the range image. As an example of this embodiment, the threshold is dynamic (e.g., the threshold changes over time based on the range image or some other factor). In another embodiment, the threshold is identified based on one or more additional or alternative factors.

The technique further includes selection of an identified low-intensity point to test at 1210. Specifically, one of the low-intensity points identified at 1205 is then selected for review.

The technique further includes identifying, at 1215, a filtering kernel based on the selected low-intensity point. As previously noted, in one embodiment a single filtering kernel is used for the entire tensor 1105. In another embodiment, different filtering kernels are used based on the selected low-intensity point. For example, different filtering kernels are used based on different elevation angles, azimuth angles, etc.

The technique further includes finding, at 1220, all high-intensity points that fall within the kernel-based ghost zone (s). Specifically, and as will be explained in greater detail with respect to FIG. 13, application of the filtering kernel includes overlaying the filtering kernel on the tensor 1105. The filtering kernel is based on the ghost point regions 1005/1010 and the center point 1000 described with respect to FIG. 10. Conceptually, and at a high-level for the sake of description, the center point 1000 is aligned with the low-intensity point selected at 1210. A number of high-intensity points (e.g., data points 1110 with a value of the intensity channel 1120 at or above a threshold) is then identified at 1220. Similarly to the low-intensity points described above, in one embodiment the high-intensity points are identified based on a pre-identified threshold. In another embodiment, the threshold is identified based on analysis of the intensity values of various data points in the range image and, as a particular example, is dynamic as described above. In yet another embodiment, the threshold is identified based on one or more additional or alternative factors.

In one embodiment, the low-intensity threshold and the high-intensity threshold are separated from one another such that the low-intensity threshold has optical intensity values between 0 and x, and the high-intensity threshold has optical intensity values between y and 255. Values between x and y may be considered to be neither low-intensity values nor high-intensity values and therefore are not identified at either 1205 or 1220. In another embodiment, the low-intensity values are between 0 and x, and the high-intensity values are between x and 255.

The number of high-intensity points in the ghost zone(s) are then counted at 1225. In one embodiment, only high-intensity points in a single ghost zone (e.g., only one of ghost zones 1005 or 1010) are counted. In another embodiment, high-intensity points in two or more ghost zones (e.g., ghost zones 1005 and 1010) are counted.

In one embodiment, a distance to the low-intensity point identified at 1205 is determined. Specifically, the distance to the low-intensity point from the vehicle or LiDAR system is determined. In this embodiment, only high-intensity points that have a distance within a range of the distance to the low-intensity point may be identified at 1220 or counted at 1225. In this manner, the system is able to verify that the low-intensity points and the high-intensity points are related to one another such that the low-intensity point may be a ghost point that is caused by the high-intensity point rather than data points at two different distances, which would mean that they are likely unrelated to one another. In one embodiment, the range of the distance may be on the order of +/−1 meter (m), while in other embodiments the range of the distance may be on the order of +/−0.5 m, +/−0.25 m, etc. The specific range of the distance may be different based on, for example, the type of LiDAR system used, the initial distance to the low-intensity point identified at 1205, etc.

The number of high-intensity points is then compared against a region number threshold at 1230. Specifically, the number of high-intensity points identified within the ghost zone(s) at 1225 are compared against a value associated with the region number threshold. If the number of high-intensity points is above (or, optionally, at or above) the value associated with the region number threshold, then the low-intensity point selected at 1210 is identified as a ghost point and removed from the range image on which the tensor 1105 is based, or more specifically, the point cloud of the range image. If the number of high-intensity points is below (or, optionally, at or below) the value associated with the region number threshold, then the low-intensity point is identified to not be a ghost point and is not removed from the range image. Similarly to the other thresholds described above, in one embodiment the region number threshold is based on a pre-identified value related to a factor such as the type of LiDAR system (e.g., one or more components of the LiDAR system), the environment in which the LiDAR system is located, etc. In another embodiment, the region number threshold is identified based on analysis of the range image or some other factor. The technique may then return to 1210 to select another low-intensity point of the low-intensity points identified at 1205.

It will be understood that this technique is intended as an example technique, and another embodiment will include a technique with one or more variations from that depicted in FIG. 12. For example, another embodiment may have more or fewer elements than depicted, elements in a different order than depicted, etc.

Figure 13:
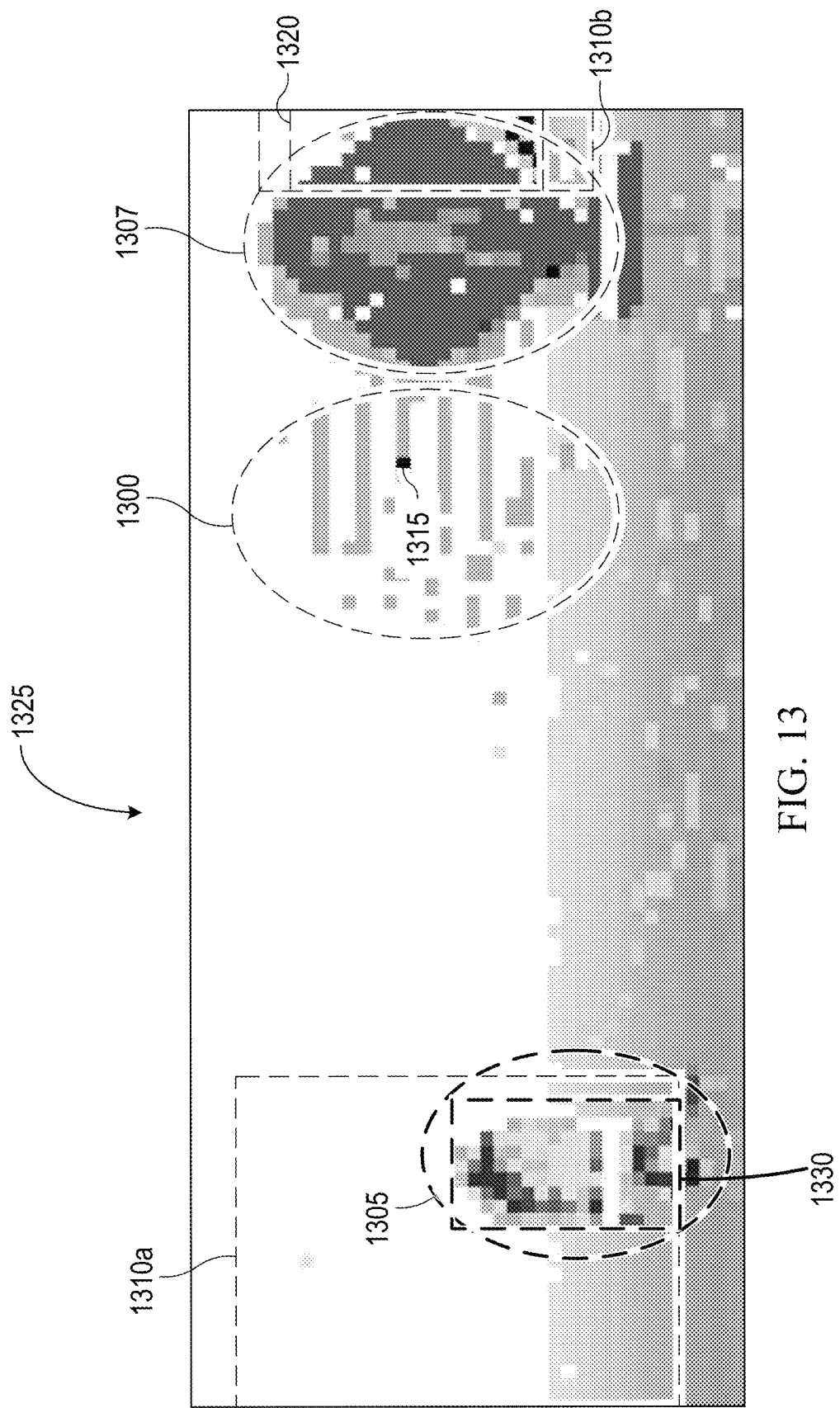
FIG. 13 depicts a graphical example of the identification and removal of a ghost point based on a ghost point region.

FIG. 13 depicts a graphical example of the identification and removal of a ghost point based on a ghost point region. Specifically, FIG. 13 depicts a range image 1325 that includes elements that are similar to those depicted in model 800 of FIG. 8. The range image 1325 depicts a point cloud 1305 related to an individual, a point cloud 1307 related to a sign, and a point cloud 1300 of low-intensity points which are respectively similar to the point cloud 820 of the individual 810, point cloud 825 of the sign 815, and the point cloud 830.

FIG. 13 further depicts the overlay of a filtering kernel onto the range image 1325. Specifically, FIG. 13 depicts a low-intensity point 1315 that is selected for analysis, for example as described above with respect to element 1210. Based on that low-intensity point, a filtering kernel is identified as described with respect to element 1215. The filtering kernel includes ghost zones 1310*a* and 1310*b*, which are respectively similar to ghost zones 1005 and 1010 of FIG. 10.

The point clouds 1305 and 1307 both include high-intensity points. As described with respect to elements 1220 and 1225, the high-intensity points in the ghost zones 1310*a* and 1310*b* are identified and counted. For example, the high-intensity points 1320 corresponding to the point cloud 1307 related to the sign within the ghost zone 1310*b* are identified and counted. Additionally or alternatively, the high-intensity points 1330 (if any) of the point cloud 1305 related to the individual within the ghost zone 1310*a* are identified and counted. The number of high-intensity points are then compared to a value associated with a region number threshold as described with respect to element 1230. If the number of high-intensity points are above (or, alternatively, at or above) the value associated with the region number threshold, then the low-intensity point 1315 is identified as a ghost point and removed from the point cloud 1300 and the range image 1325.

Figure 14:
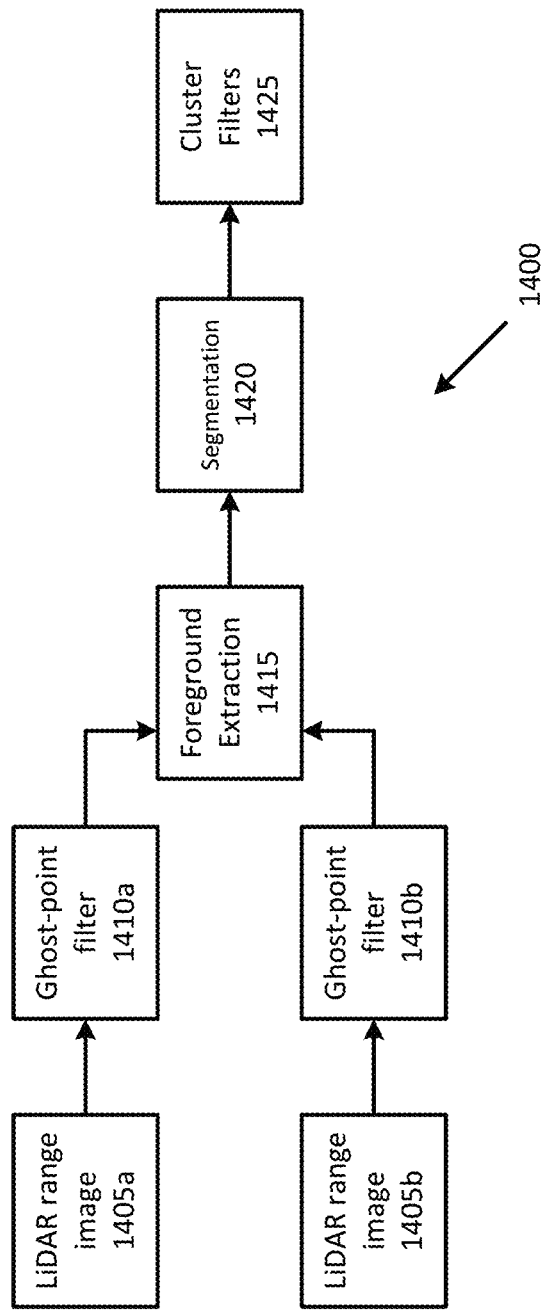
FIG. 14 depicts an example of a LiDAR pipeline.

FIG. 14 depicts an example of a LiDAR pipeline 1400. Typically, the LiDAR pipeline 1400 is enacted by, or an element of, a system such as the perception system 302 of FIG. 3. More generally, the LiDAR pipeline 1400 is enacted by, or an element of, a processor such as processor 204 of FIG. 2.

Initially, a number of LiDAR range images 1405*a* and 1405*b* are input to the pipeline 1400. It will be understood that although only two LiDAR range images are depicted in FIG. 14, another embodiment includes more or fewer range images 1405*a*/1405*b*. Respective ones of the LiDAR range images 1405*a*/1405*b* are similar to the range image 1325 described above and include various point clouds such as point clouds 1300, 1305, and 1307.

The range images 1405*a*/1405*b* are input to ghost point filters 1410*a*/1410*b*. Respective ones of the ghost point filters 1410*a*/1410*b* apply a filtering kernel to identify and remove ghost points, as described with respect to FIG. 12. As shown in FIG. 14, the ghost point filters 1410*a* and 1410*b* are independent from one another. For example, the ghost point filters 1410*a* and 1410*b* may be enacted by different hardware, software, firmware, etc. In another embodiment, the ghost point filters 1410*a* and 1410*b* may be the same filter, or subelements of the same filter.

The range images, after ghost point filtering, are then provided to other elements of the LiDAR pipeline. For example, in one embodiment they are output and provided to a foreground extraction system 1410 where the images are merged and processed. The foreground extraction system 1415, in one embodiment, is configured to extract foreground objects in the range image. The output of the foreground extraction system 1415 includes the extracted foreground objects, and is provided to a segmentation system which is configured to classify point clouds into homogenous regions that have similar properties to one another. The output of the segmentation system 1420 includes an indication of the classified point clouds, and, more particularly, individually classified point clouds. The classified point clouds are provided to a noise filter 1425 which is configured to remove noise from the point clouds (e.g., artifacts from errors or other data points that do not correspond to one or more of the homogenous regions from the segmentation system).

It will be understood that this pipeline is intended as an example pipeline in accordance with one embodiment, and other embodiments will include more or fewer elements, or elements arranged in a different order. However, it will be further understood that the presence of the ghost point filters 1410*a*/1410*b* at an initial stage of the LiDAR pipeline will provide significant benefits in that the filters will operate on respective LiDAR point clouds independently, and, as a result, be computationally efficient.

Figure 15:
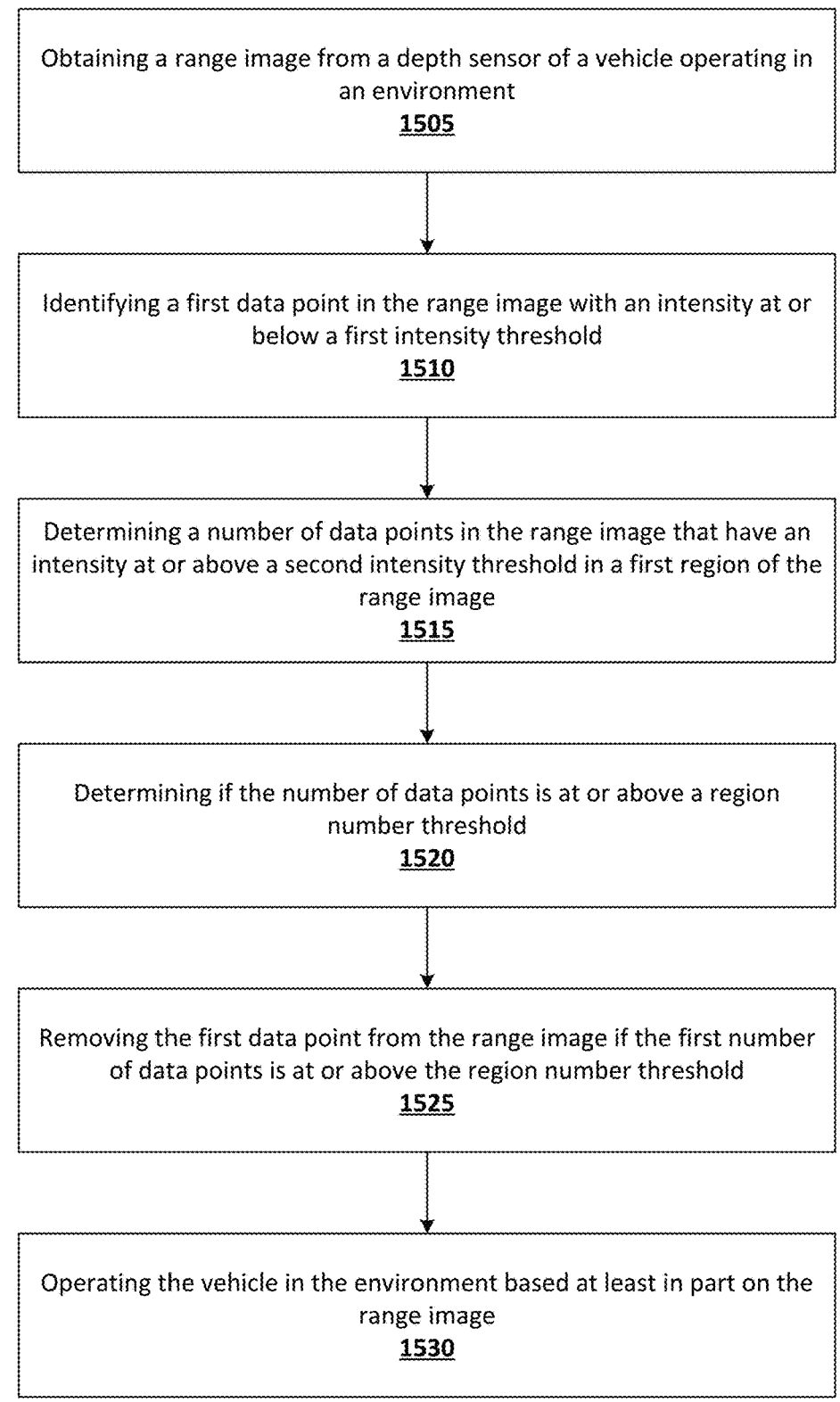
FIG. 15 depicts an example of a technique related to identifying and removing a ghost point from a point cloud.

FIG. 15 depicts an example of a technique related to identifying and removing a ghost point from a point cloud. Generally, the technique of FIG. 15 may be considered to be similar to the technique of FIG. 12. Similarly to the technique of FIG. 12 the technique is performed by, in whole or in part, a perception system such as perception system 302 of FIG. 3, a processor such as processor 204 of FIG. 2, or some other element of a LiDAR system or vehicle as described herein.

The technique includes obtaining, at 1505, a range image from a depth sensor of a vehicle operating in an environment. The range image is similar to, for example, range image 1325 or some other range image described herein.

The technique further includes identifying, at 1510, a first data point in the range image with an intensity at or below a first intensity threshold. This data point is, for example, the low-intensity data point described with respect to element 1210 of FIG. 12. The first intensity threshold is the intensity threshold described with respect to, for example, element 1205 of FIG. 12.

The technique further includes determining, at 1515, a number of data points in the range image that have an intensity at or above a second intensity threshold in a first region of the range image. Specifically, the technique includes determining the number of high-intensity data points in a region of the range image such as the ghost zones described with respect to, for example, elements 1005/1010 or 1310*a*/1310*b*. Determination of the number of high-intensity data points in these regions is as described with respect to, for example, elements 1220 and 1225.

The technique further includes determining, at 1520, if the number of data points identified at 1515 is at or above a region number threshold. This determination and the region number threshold are similar to, for example, the determination and threshold value described with respect to element 1230.

The technique further includes removing, at 1525, the first data point from the range image if the number of data points is at or above the region number threshold. For example, as described with respect to element 1230, the first data point (e.g., the low-intensity data point) is removed from the range image if the number of identified high-intensity data points within the ghost zone(s) is at or above a region number threshold. This is because the low-intensity data point is identified as being a ghost point based on the presence of the high-intensity data points within the ghost zones.

The technique further includes operating (or facilitating operation of), at 1530, of the vehicle in the environment based at least in part on the range image. For example, in an embodiment the processor then uses the output range image as the basis for functions such as path planning of the vehicle. In another embodiment, the processor outputs the range image to another processor or system of the vehicle (e.g., control system 306 of FIG. 3) which then uses the range image to control one or more functions of the vehicle.

Similarly to FIG. 12 described above, it will be recognized that the technique of FIG. 15 is intended as an example technique in accordance with one embodiment, and another embodiment may vary. For example, another embodiment will include more or fewer elements than those depicted in FIG. 15, elements arranged in a different order than depicted, etc.

Other variations may be present in yet further embodiments. For example, one embodiment includes an additional element related to distinguishing different point clouds that are produced by different LiDAR systems to identify which point cloud is the cause of which ghost points. In another embodiment, the first data point (e.g., the ghost point) is not removed from the image, but rather information related to the first data point is altered. For example, a flag value is added or altered to indicate that the first data point is identified as a "ghost point." In this embodiment, the first data point remains in the image, but is processed differently by a downstream component of a LiDAR pipeline such as pipeline 1400.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   obtaining, using at least one processor, a range image related to a depth sensor of a vehicle operating in an environment;
   identifying, using the at least one processor, a first data point in the range image with an intensity at or below a first intensity threshold;
   determining, using the at least one processor, a first number of data points in the range image that have an intensity at or above a second intensity threshold in a first region of the range image;
   determining, using the at least one processor, whether the first number of data points is at or above a region number threshold;
   removing, using the at least one processor, the first data point from the range image if the first number of data points is at or above the region number threshold; and
   facilitating, using the at least one processor, operation of the vehicle in the environment based at least in part on the range image.

2. The method of claim 1, wherein the first data point is a data point of a point cloud in the range image.

3. The method of claim 1, further comprising:
   determining, using the at least one processor, a second number of data points in the range image that have an intensity at or above the second intensity threshold in a second region of the range image; and
   removing, using the at least one processor, the first data point if a combined total of the first number of data points and the second number of point are at or above the region number threshold.

4. The method of claim 1, wherein the first and second intensity thresholds are pre-determined intensity thresholds.

5. The method of claim 1, wherein the range image includes a plurality of scan lines, and wherein the first and second intensity thresholds of a first scan line of the plurality of scan lines are different from corresponding first and second intensity thresholds of a second scan line of the plurality of scan lines.

6. The method of claim 1, wherein determining the first number of data points is based on use of a filtering kernel.

7. The method of claim 6, wherein the filtering kernel is based on the first region.

8. The method of claim 6, wherein the range image includes a plurality of scan lines, and wherein a filtering kernel applied to a first scan line of the plurality of scan lines is different from a filtering kernel applied to a second scan line of the plurality of scan lines.

9. The method of claim 1, wherein the first intensity threshold has an intensity value in a first range, and the second intensity threshold has an intensity value in a second range that is greater than the first range.

10. The method of claim 1, wherein removing the first data point from the range image is further based on determining that the first number of data points are within a distance range to the first data point as measured from the depth sensor of the vehicle.

11. A perception system that includes a ghost point filter for use in a vehicle, wherein the system comprises:
    at least on processor; and
    at least one memory storing instructions thereon that, when executed by the at least one processor, cause the vehicle to:
      identify, by the ghost point filter in a range image that represents an environment in which the vehicle is located, a first data point with an intensity at or below a first intensity threshold;
      remove, by the ghost point filter, the first data point from the range image if a number of data points in a first region of the range image that have an intensity at or above a second intensity threshold are at or above a region number threshold; and
      filter, by a foreground extraction system, the range image.

12. The perception system of claim 11, wherein the instructions are further to remove, by the ghost point filter, the first data point from the range image if a total of i) the number of data points in the first region of the range image with an intensity at or above the second intensity threshold and ii) a number of data points in a second region of the range image that have an intensity at or above the second intensity threshold are at or above the region number threshold.

13. The perception system of claim 11, wherein the instructions are further to identify, by the ghost point filter, the number of data points in the first region of the range image that have an intensity at or above the second intensity threshold based on use of a convolutional kernel.

14. The perception system of claim 11, wherein the range image is a range image based on a depth sensor of the vehicle.

15. The perception system of claim 11, wherein the range image received by the foreground extraction system from the ghost point filter includes the first data point if the number of data points in the first region of the range image that have an intensity at or above the second intensity threshold are below the region number threshold.

16. A method comprising:
    identifying, by one or more processors of a vehicle based on a location of a data point of a point cloud in a range image related to an environment of the vehicle, a number of data points of the range image in a first region and a number of data points of the range image in a second region; and altering information related to the data point based on the number of data points of the range image in the first and second regions;

wherein the first region and the second region are based on a pre-identification of an optical signal received by circuitry of a depth sensor outside of an intended transmission and reception path of the depth sensor.

17. The method of claim 16, wherein altering the information related to the data point includes removing, by the one or more processors, the data point from the point cloud.

18. The method of claim 16, wherein altering the information related to the data point includes appending, by the one or more processors, an indication to the information related to the data point, wherein the information is to indicate that the data point is to be processed differently than another data point that does not include the indication.

19. The method of claim 16, wherein the first region is located in a first direction with respect to the data point of the point cloud, and the second region is located in a second direction that is opposite the first direction with respect to the data point of the point cloud.

20. The method of claim 16, wherein the depth sensor is a light detection and ranging (LiDAR) sensor.

* * * * *